US012569844B2

(12) United States Patent
Born et al.

(10) Patent No.: US 12,569,844 B2
(45) Date of Patent: Mar. 10, 2026

(54) SAMPLE TEST CASSETTE AND ANALYTE TEST SYSTEM UTILIZING THE SAME

(71) Applicant: Foss Analytical A/S, Hilleroed (DK)

(72) Inventors: Christian Born, Hilleroed (DK); Allan Bjerre Abbondio, Hilleroed (DK); Steen Hauge Matthiesen, Hilleroed (DK)

(73) Assignee: FOSS Analytical A/S, Hilleroed (DK)

(*) Notice: Subject to any disclaimer, the term of this patent is extended or adjusted under 35 U.S.C. 154(b) by 885 days.

(21) Appl. No.: 17/789,689

(22) PCT Filed: Nov. 25, 2020

(86) PCT No.: PCT/IB2020/061131
§ 371 (c)(1),
(2) Date: Jun. 28, 2022

(87) PCT Pub. No.: WO2021/171077
PCT Pub. Date: Sep. 2, 2021

(65) Prior Publication Data
US 2023/0036668 A1 Feb. 2, 2023

(30) Foreign Application Priority Data
Feb. 28, 2020 (DK) ............................ PA202000257

(51) Int. Cl.
*B01L 3/00* (2006.01)

(52) U.S. Cl.
CPC ......... *B01L 3/5023* (2013.01); *B01L 2200/04* (2013.01); *B01L 2200/16* (2013.01);
(Continued)

(58) Field of Classification Search
CPC ............... B01L 3/5023; B01L 2200/04; B01L 2200/16; B01L 2300/0654;
(Continued)

(56) References Cited

U.S. PATENT DOCUMENTS 6,074,606 A * 6/2000 Sayles ................ A61B 10/0064 422/417
6,342,183 B1 * 1/2002 Lappe ................. G01N 33/528 422/417
(Continued)

FOREIGN PATENT DOCUMENTS

GB 2460956 A 12/2009
WO WO-00/46598 A1 8/2000
(Continued)

OTHER PUBLICATIONS

"Charm EZ System," available at <https://www.charm.com/wp-content/uploads/2018/06/MRK- 510-8.5-x-11-email.pdf>, 4 pages, retrieved Jun. 2022.
(Continued)

*Primary Examiner* — Samuel P Siefke
(74) *Attorney, Agent, or Firm* — Harness, Dickey & Pierce, P.L.C.

(57) ABSTRACT

A sample test cassette includes an inlet configured to introduce a sample liquid into the sample test cassette; an elongate channel configured to receive an elongate lateral flow test strip and configured with a first end that is configured to be in liquid communication with the inlet; and a mechanical transport system that is an integral part of the sample test cassette and is configured to generate a flow of the sample liquid from outside of the inlet and towards the first end of the elongate channel.

20 Claims, 7 Drawing Sheets

(52) U.S. Cl.
CPC . *B01L 2300/0654* (2013.01); *B01L 2300/069* (2013.01); *B01L 2300/0825* (2013.01); *B01L 2400/0478* (2013.01)

(58) Field of Classification Search
CPC ....... B01L 2300/069; B01L 2300/0825; B01L 2400/0478; G01N 33/54388; G01N 33/54366
See application file for complete search history.

(56) References Cited

U.S. PATENT DOCUMENTS

| | | | | |
|---|---|---|---|---|
| 10,495,635 | B2 * | 12/2019 | Jian-Feng | B01L 3/5023 |
| 2012/0282681 | A1 | 11/2012 | Teixeira et al. | |
| 2015/0160208 | A1 | 6/2015 | Guirguis | |
| 2018/0304260 | A1 | 10/2018 | Thomas et al. | |

FOREIGN PATENT DOCUMENTS

| | | | |
|---|---|---|---|
| WO | WO-2005/045408 | A1 | 5/2005 |
| WO | WO-2012/150544 | A1 | 11/2012 |
| WO | WO-2017/143323 | A1 | 8/2017 |

OTHER PUBLICATIONS

International Search Report for International Application No. PCT/IB2020/061131 dated Feb. 5, 2021.
Written Opinion for International Application No. PCT/IB2020/061131 dated Feb. 5, 2021.
Danish Search Report For European Patent Application No. PA 2020 00257 dated May 29, 2020.

* cited by examiner

SAMPLE TEST CASSETTE AND ANALYTE TEST SYSTEM UTILIZING THE SAME

CROSS-REFERENCE TO RELATED APPLICATIONS

This application is a National Stage of PCT/IB2020/061131, filed on Nov. 25, 2020, which claims priority to Danish Patent Application PA202000257, filed on Feb. 28, 2020 in the Danish Patent and Trademark Office, the entire contents of each of which are incorporated herein in their entirety.

BACKGROUND

The present invention relates generally to the detection of one or more analytes in a sample liquid using lateral flow test strips and includes a sample test cassette therefor, as well as an analyte test system utilizing the same.

The detection of analytes in a sample liquid using an immunoassay based device employing a lateral flow test strip (also often referred to as a lateral flow device or LFD) is well known. Many of these immunoassay based devices include a rigid housing encasing an elongate lateral flow test strip of known type. One such immunoassay based device is described in U.S. Pat. No. 9,833,783 and comprises a cassette formed internally with at least one elongate channel for locating therein an elongate lateral flow test strip orientated with one end in liquid communication with a liquid flow channel. A liquid receiving void is provided as an inlet for receiving a sample liquid and is in liquid communication with the flow channel at a location upstream of the at least one elongate channel. Sample liquid is pipetted into the liquid receiving void by a user and is transported under gravity to contact the end of the test strip which is in liquid communication with the liquid flow channel. Once contacted with the end of the test strip liquid flows laterally along the element by capillary flow and either any analyte therein, or a complex thereof, or some other reagent in the test strip interacts with suitable capture agents bound at one or more test zones of an analysis region of the test strip to thereby produce a detectable signal. An inspection of the analysis region is made either visually or with a reader to determine the presence of analyte in the liquid. Control zones may also be included in the analysis region and similarly inspected to determine the correct operation of the test strip or to aid in the quantitative determination of analyte in the liquid.

SUMMARY

According to a first aspect of the present invention there is provided a sample test cassette comprising an inlet for introducing a sample liquid into the sample test cassette; and one or more elongate channels, each for receiving an elongate lateral flow test strip and each configured with a first end in liquid communication with the inlet; wherein the sample test cassette further comprises an integral mechanical transport system adapted to generate a flow of sample liquid from outside of the inlet and to the first end of each of the one or more elongate channels. The integral mechanical transport system allows for the introduction of sample liquid to each lateral flow test strip received in the elongate channel(s) in a controllable manner so that one or both the amount of sample introduced and the flow rate can be controlled and/or automated in a repeatable manner and a multiplexed test using multiple test strips may be initiated simultaneously. Such a sample test cassette may be used by essentially untrained operators with a reduced potential for operator-induced errors.

In some embodiments, the flow channel comprises a reservoir, such as may be provided by a well and/or a bibulous material, located in liquid communication with the first end of each of the one or more elongate channels. This has an advantage that an adequate volume of liquid may be retained for uptake by lateral flow test strips located in one or more of the elongate channels without the need to provide a continuous flow in the cassette.

In some embodiments the transport system comprises a piston pump having a variable volume pump chamber in fluid communication with the inlet.

In some embodiments at least a section of a wall of the sample test cassette that overlies at least a portion of each of the one or more elongate channels corresponding with an analysis zone of a lateral flow test strip received therein is adapted to allow transmission of optical radiation to and from the analysis zone. This permits detection of an analyte of interest by optical interrogation of the lateral flow test strips.

According to a second aspect of the present invention there is provided an analyte test system comprising a housing; a reading system, preferably an optical reading system; and one or more holders; wherein each of the one or more holders is configured to releasably locate a sample test cartridge as claimed in any preceding claim in a reading position, at which reading position the reading system is aligned all of the one or more elongate channels to permit an interrogation of each test strip located in the one or more elongate channels to test for the presence of an analyte in the sample, for example by detection of light after transmission through, reflection from or passive (fluorescence, say) or active (electrochemical luminescence, say) generation at, an analysis region of each test strip.

In some embodiments the reading system is an optical reading system which comprises an own light source and an own optical detector located internal of each holder. This permits movement of the holder, such as rotation of the holder into and out of the housing, whilst maintaining the alignment of the optical reading system so that interrogation may be made at different positions of the holder.

In some embodiments the analyte test system further comprises an actuator mechanism adapted to engage with the transport system of a sample test cartridge located in the holder and to actuate the transport system to generate the flow of liquid.

In some embodiments each holder holds internally an own actuator mechanism.

In some embodiments the actuator may comprise an electric motor and in other embodiments the actuator may comprise a wound spring driven motor where, usefully, the spring may be wound by the action of placing the sample test cassette in the holder or the holder in the housing.

BRIEF DESCRIPTION OF THE DRAWINGS

These and other features and advantages of the present invention will now be further described with reference to, and will become apparent from, exemplary embodiments which are illustrated in the drawings of the accompanying figures, of which.

DETAILED DESCRIPTION

As used within this specification, including in the claims, the singular articles "a"; "an" and "the" include the plural unless the context clearly indicates otherwise. The use of the phrases "one or more", "at least one" or similar phrases, does not alter the generality of the foregoing.

Figure 1:
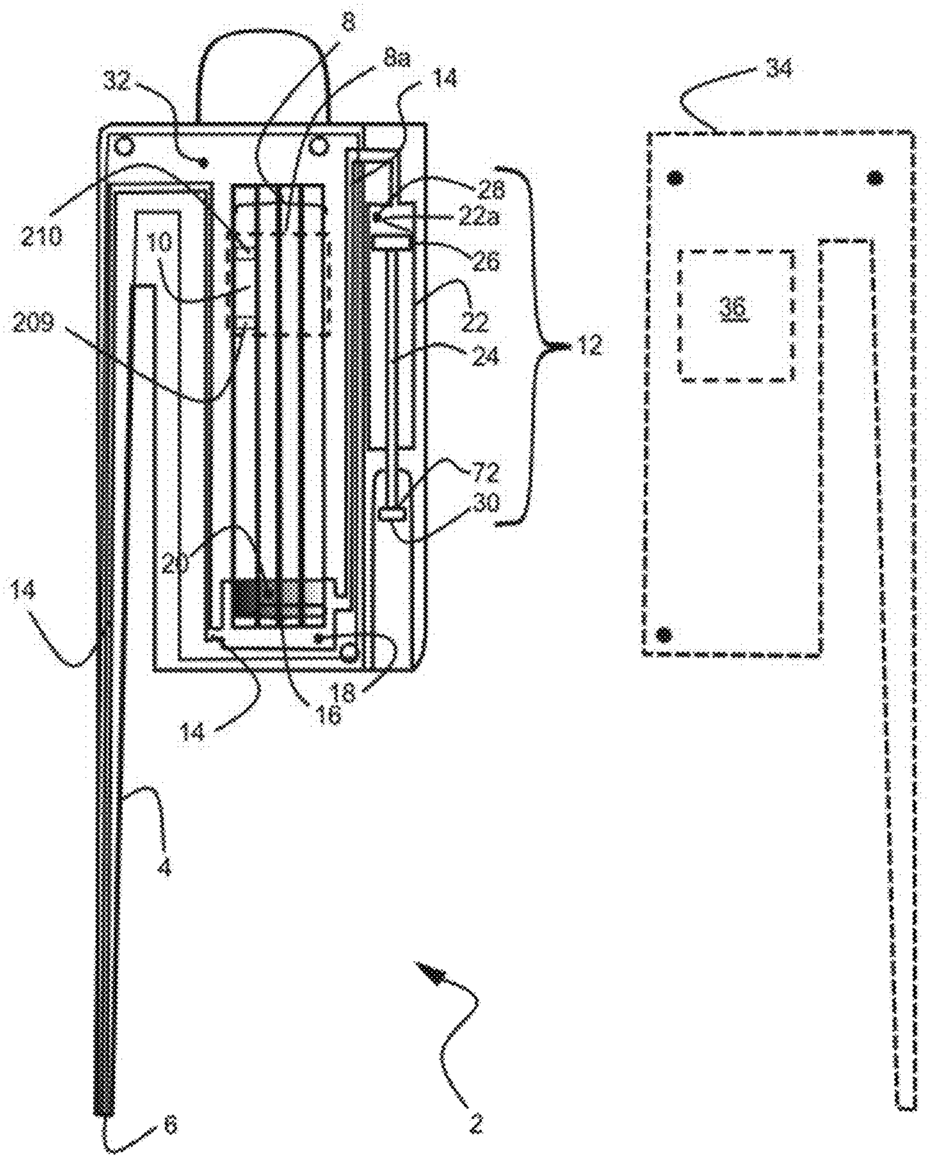
FIG. 1 Illustrates a first embodiment of a sample test cassette.

An example of a sample test cassette 2 according to the present invention is illustrated in FIG. 1. The sample test cassette 2 comprises an inlet 4 having an externally accessible opening 6 through which a sample liquid may pass into the sample test cassette 2; one or more (illustrated 4) elongate channels 8 for retaining therein a respective elongate lateral flow test strip 10 (here one illustrated); and a mechanical transport system 12 which is made as an integral part of the sample test cassette (2).

Figure 2:
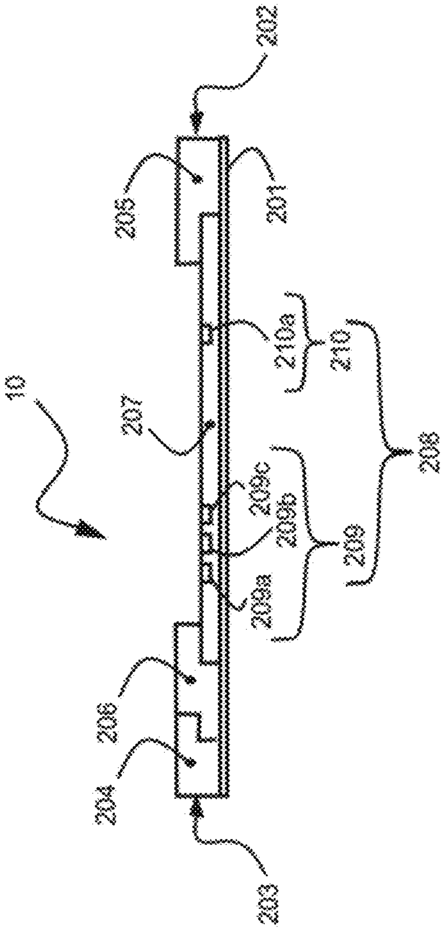
FIG. 2 Illustrates an elongate test strip of known type suitable for use in the sample cassette of FIG. 1.

An example of an elongate lateral flow test strip 10 which is suitable for use in the sample test cassette 2 of the present invention is illustrated in FIG. 2 and is of a generally known construction. The elongate lateral flow test strip 10 comprises a rigid elongate support 201 having a downstream end 202 and an upstream end 203. A sample pad 204 for receiving a sample liquid is affixed to the support 201 proximal its upstream end 203 and a waste pad 205 is affixed to the support 201 proximal its downstream end 202. A probe pad 206 is affixed to the support 201 in physical contact with the sample pad 204 and releasably holds probe elements which are designed to bind to and flow with specific analytes in the sample liquid. A porous membrane 207 is affixed to the support 201 and extends between and contacts the probe pad 206 and the waste pad 205. The porous membrane 207 has an analysis zone 208 which consists of one or more test zones (one shown 209) and one or more control zones (one shown 210). Each test zone 209 comprises one or more spatially defined test regions (here three shown 209*a*, 209*b*, 209*c*), which may be strips or points provided on the porous membrane 207, each region fixedly holds a same or different specific recognition elements (such as aptamers, receptor protein fragments or antibodies) which are selected to bind to specific analytes in a sample liquid. Each control zone 210 comprises one or more spatially defined control regions (here one shown 210*a*), which may be strips or points provided on the porous membrane 207, each region fixedly holds affinity ligands which typically binds probe elements which were originally contained in the probe pad 206. Typically, in use the sample pad 204 acts as a sponge to hold an excess of the sample liquid. Once the sample pad 204 is soaked, the sample fluid will flow from the sample pad 204 and into the probe pad 206 in which the probe elements are releasably stored. The sample fluid, including the probe bound analyte, flows from the probe pad 206 and along the elongate porous membrane 207 by capillary action to reach the test zone 209 where the probe elements of a specific test region 209*a*, 209*b* or 209*c* bind to and capture at least some of the probe bound analyte. The remaining liquid continues to flow in the elongate porous membrane 207 to reach the control zone 210 (placed downstream of the test zone 209 in the direction of flow of the liquid along the test strip 10) where probe elements remaining in the liquid are captured and bound and provides an indication that the test is working correctly. Liquid continues to flow in the elongate porous membrane 207 until it reaches the waste pad 205 which acts as a waste reservoir.

It will be appreciated that other, known, types of lateral flow test strip may be employed without departing from the invention as claimed, for example a lateral flow test strip generally as described above may be employed in which at least one of the sample pad 204, probe pad 206 and the waste pad 205 may be omitted.

Considering again FIG. 1, a conduit 14 connects the inlet 4 to a first end 16 of each of the elongate channels 8 and provides a liquid passageway for a sample liquid from external the opening 6 to each of the ends 16. In the present embodiment a reservoir 18 is provided connected to the conduit 14 and to the first ends 16 of the channels 8. The reservoir 18 provides a common source of liquid to each of the first ends 16 for uptake by a lateral flow test strip 10 retained in a respective elongate channel 8 and orientated with its sample receiving end, here the sample pad 204, positioned towards the first end 16 of the elongate channel 8 in which it is retained. In some embodiments (as illustrated in FIG. 1) a bibulous material 20 may be provided in or as the reservoir 18 for maintaining sample liquid in contact with the sample pad(s) 204. The conduit 14 also connects the first ends 16 (here illustrated as a connection via the reservoir 18) to the mechanical transport system 12. The mechanical transport system 12 operates to generate a flow of sample liquid from the outside of the opening 6, through the sample test cassette 2 and at least into the reservoir 18 in order to provide a source of sample liquid for uptake by the one or more elongate lateral flow test strips 10 that are each located in a respective elongate channel 8. It will be appreciated that in order to use the sample test cassette 2 it is not essential that all elongate channels 8 of the sample test cassette 2 contain a test strip 10. Moreover, it is not essential that each test strip 10 has the same number of test regions 209*a*, 209*b*, 209*c* and/or control 210*a* regions or that each test region 209*a*, 209*b*, 209*c* of different test strips 10 hold the same recognition elements. In some embodiments, each of the plurality of test strips held in a sample cassette may comprise only one test region but each test region holds a different recognition element. Thus multiple analytes may be readily and simply tested for using a same sample test cassette.

In the present embodiment the mechanical transport system 12 consists of a piston pump assembly which comprises a pump chamber 22 that is arranged in fluid communication with an end of the conduit 14; and a piston 24 having a first end 26 slidably engaged with an inner wall 22*a* of the pump chamber 22 to delimit therewith a variable volume fluid receiving space 28. A second end 30 of the piston 24 is also provided which is accessible external of the sample test cassette 2.

In some embodiments the maximum volume of the variable volume fluid receiving space 28 (i.e. when the piston 24 is at maximum extension) is selected to be approximately equal to the volume of liquid necessary to fill the reservoir 18. In this way an amount of sample liquid introduced into the sample test cassette 2 may be limited to that necessary for correct operation of the test strip(s) 10 without liquid being drawn into the variable volume fluid receiving space 28.

A part of the sample test cassette 2 which overlies at least a portion 8*a* of each of the one or more elongate channels 8 that corresponds with an analysis zone 208 of a lateral flow test strip 10 when the test strip 10 is received therein is constructed to permit an external optical inspection of the test strip 10, in particular of the analysis zone 208 of the test strip 10. In the present embodiment this part is provided by a transparent wall section 32. By way of example only, the transparent wall section 32 may extend to also cover the conduit 14, the reservoir 18 and the entire length of the elongate channels 8. The transparent wall section 32 may be permanently bonded to the cassette to form a fluid tight cover after insertion of the elongate lateral flow test strip(s) 10 into corresponding channel(s) 8. Thus a disposable, one-time use, sample test cassette 2, may be constructed. This at least simplifies the formation of the conduit 14 which, instead of being constructed as a bore through solid material, may now be more simply and accurately constructed as a channel to be covered by the separate transparent wall section 32.

In other embodiments, the transparent wall section 32 may be formed as a window covering essentially only the portions 8*a* of the elongate channel(s) 8 which will overlie the analysis zone(s) 208 of the test strip(s) 10, or may be omitted entirely and a solid wall section 34 provided to cover the conduit 14, the elongate channel(s) 8 and the reservoir 18 once the test strip(s) 10 are loaded into the elongate channel(s) 8. In such embodiments an aperture 36 is formed in the solid wall section 34 to overlie the portions 8*a* of the elongate channel(s) 8 that corresponds with the analysis zone(s) 208 and provides for external optical inspection of the analysis zone(s) 208. In some embodiments the transparent wall section 32 may be provided as part of a covering bonded to each of the lateral flow test strip(s) 10.

An analyte test system 38 which is suitable for use with a sample test cassette 2 described above is will now be described with reference to the illustrations contained in FIG. 3 and FIG. 4. The analyte test system 38 comprises a housing 40 having a number of slots 42 (here three) formed therein; an optical reading system 48; and a user interface 44 for inputting data into and/or for receiving data from the analyte test system 38. The user interface 44 is here illustrated as comprising a display, usefully a touch display region 44*a*, and a keypad region 44*b* by which a user can interact with the analyte test system 38. In some embodiments the user interface 44 may be incorporated, in whole or in part, in a smart device such as a smartphone or tablet computer. The analyte test system 38 may be powered from an external power source (such as mains supply); an internal power source (such as a battery) or both selectively. An optical reader (not shown) may usefully be incorporated into the housing 40 and may be configured to read a bar-code or QR-code which is associated with the sample test cassette 2 and which may hold or point to information related to the test or tests to be performed by the one or more test strip(s) 10 which are housed in that sample test cassette 2. Such information may be employed in the analyte test system 38 to control the operation of certain components of the analyte test system 38 in order to provide a test protocol specific to the sample test cassette 2.

The slots 42 are each adapted to releasably receive and hold a sample test cassette 2 in a reading position at which the optical reading system 48 is aligned in an optical path with the portion(s) 8*a* of the elongate channel(s) 8 corresponding with the analysis zone(s) 208 of the lateral flow test strip(s) 10 received therein. In the present embodiment each slot 42 is adapted to retain (usefully releasably) a holder 50 which, in turn, is adapted to releasably receive and hold a sample test cassette 2 in a cavity or slot 51 so that the sample test cassette 2 is held in the reading position internal of the holder 50 in the slot 51. In other embodiments each of the one or more slots 42 may be configured to receive and hold the sample test cassette 2 directly.

Figure 3:
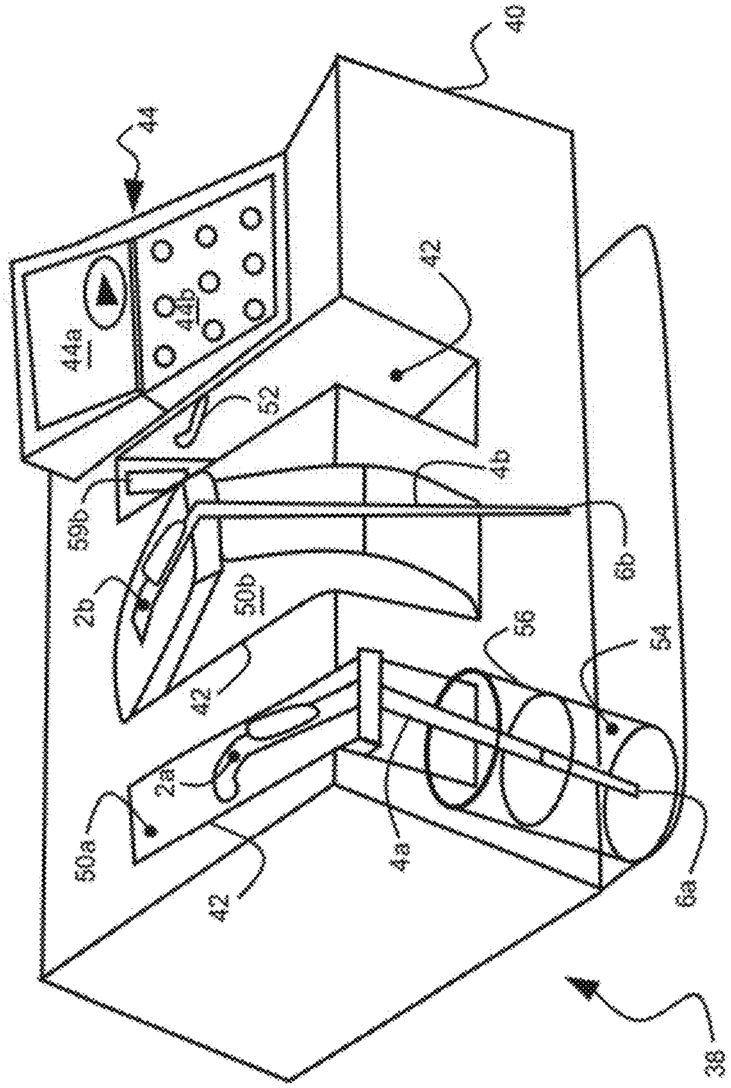
FIG. 3 Illustrates an analyte test system with a sample test cassette of FIG. 1.

In order to provide a better understanding of the analyte test system 38 of the present invention, FIG. 3 illustrates a first holder 50*a* which is fully inserted into and retained in its corresponding slot 42; a second holder 50*b* which is partially inserted into its corresponding slot 42 and an empty slot 42 in which, in the present embodiment, can be seen a one of a pair of guide grooves 52. It is not essential that all slots 42 are filled with holders 50 in order to use the analyte test system 38.

In some embodiments, as illustrated in FIG. 3, when a holder (50*a* say) is fully inserted into a corresponding one of the slots 42 the open end (6*a* say) of inlet (4*a* say) of the sample test cassette (2*a* say) can be immersed in a sample liquid 54 in a sample vial 56. When a holder (50*b* say) is rotated in a corresponding the slot 42 the corresponding open end (6*b* say) of inlet (4*b* say) can be moved to permit removal of the vial 56 (and any sample liquid 54 it contains), for example for use of the remaining sample liquid 54 in other analysers, perhaps employing different analysis modalities, whilst the lateral flow analysis is still underway.

Figure 4:
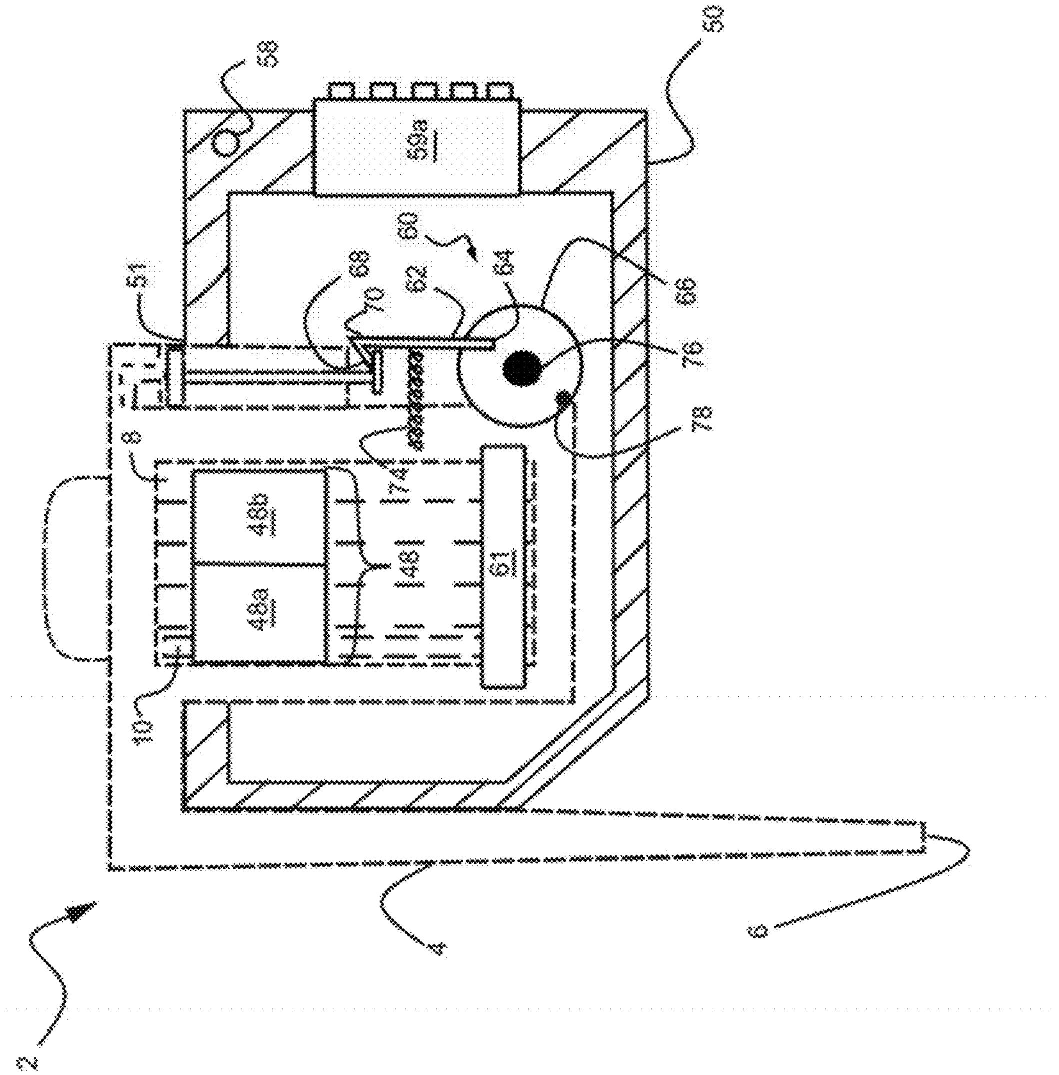
FIG. 4 Illustrates a holder of the analyte test system of FIG. 3.

In some embodiments, as illustrated in FIG. 3 and FIG. 4, a holder 50 may be provided with outwardly protruding pins 58 which engage with, and here can rotate in, the guide grooves 52 of an empty slot 42 to allow a holder (50*b* say) to be inserted into and removed from the housing 40. In some embodiments rotation of the holder (50*b* say) in a slot allows an open end 6*b* of a sample cassette 2*b* held in the holder 50*b* to be moved into and out of contact with a sample liquid and thereby facilitate the introduction of a sample vial for sample testing.

An example of a holder 50 which forms a part of the analyte test system 38 of the present invention is illustrated in section in FIG. 4 and is equivalent to the holders 50*a*, 50*b* illustrated in FIG. 3. A sample test cassette 2 is also illustrated in FIG. 4 by the broken line construction in order to show its position relative to the components of the holder 50 when it is fully located in the holder 50.

The holder 50 of the present embodiment houses the optical reading system 48 and an actuator mechanism 60. In other embodiments one or both the optical reading system 48 and actuator mechanism 60 may be located external of the holder 50 and housed within the housing 40 of the analyte test system 38.

In some embodiments at least one electrical connector 59*a* is provided in the holder 50 to interface with a corresponding connector 59*b* located in a slot 42 of the housing 40 and thereby establish data, control signal and electrical power connections, as appropriate. A wireless communications unit, such as a known Bluetooth™ or WiFi enabled unit, may be included in the holder 50 for wireless transmission of data (including data from the optical reading system 48 and/or control signals) to and from the holder 50.

In some embodiments the at least one electrical connector may comprise a cable connector provided with an interface (such as sockets) to mate with a corresponding interface (such as pins) of a cable which terminates within the housing 40.

In some embodiments a temperature regulator 61 is also housed in the holder 50. The temperature regulator 61 may for example, comprise a Peltier heater/cooler element or a resistive heating element, together with, in some embodiments, a temperature sensor, and may be employed for incubation of the sample liquid prior to testing. The temperature regulator 61 is usefully made responsive to control signals sent via the interface 59*a* to maintain the sample test cassette 2 (or relevant portions thereof) at a predetermined incubation temperature for a predetermined time. Such control signals may be generated in response to signals received from the temperature sensor, when present.

The optical reading system 48 is a one known in the art for use in reading elongate lateral flow test strips 10 and in the present embodiment is an optical reading system 48. In other embodiments the reading system may be an electrical capacitance or resistance reader of known type and the test strip(s) will be selected accordingly. The optical reading system 48 comprises a light source 48*a* and complementary detector 48*b* located at a position, in this embodiment inside the holder 50, in an optical path to permit optical interrogation of the analysis zone(s) 208 of test strip(s) 10 located in the sample test cassette 2 retained in the holder 50. Typically, and as is known, the optical reading system operates to detect optical changes which occur in the analysis zone(s) 208 of the test strip(s) as a result of interaction between components in the sample liquid flowing in the test strip(s) 10 and recognition elements in the one or more test region(s) 209*a,b* and/or *c* and in the one or more control region(s) 210*a*. It will be appreciated that an advantage of locating both the light source 48*a* and the detector 48*b* internal of the housing 40 is that the optical path permitting the optical interrogation remains invariant irrespective of the orientation of the holder 50 so that detection may be performed independently of the orientation of the holder 50 (even when a holder, 50*b* say, has been rotated, for example to allow removal of the vial 56).

Data from the detector 48*b*, representing optical information obtained from the analysis zone(s) 208, may be transmitted to external the holder 50, for example via interfaces (connectors) 59*a*, 59*b* or via a wireless communications unit, for receipt by a data processor (not shown) which may be housed in the housing 40; or which may be located external of the housing 40, such as at a remotely located server, in communication with the analyte test system 38 via a wired or wireless communications link; or which may comprise elements located both internal the housing 40 and remote of the housing 40. However configured, the data processor is adapted, through suitable programming, to process the received data to detect changes that may have occurred in the analysis zone(s) 208 and therefrom to determine the presence of one or more analytes of interest in the sample liquid 54. The results of this determination may then be supplied for presentation on the display 44*a* of the analyte test system 38. The data processor may also be adapted to control the operation of the other elements of the analyte test system 38, such as control of the temperature regulator 61 and of the actuator mechanism 60.

The actuator mechanism 60 is operable to actuate the transport system 12 of a sample test cassette 2 held in the holder 50 to cause a flow of sample liquid (say sample liquid 54 held in vial 56 illustrated in FIG. 3) from external of the opening 6 of the inlet 4 for uptake by the sample pad(s) 204 of an elongate lateral flow test strip(s) 10 held in the sample test cassette 2.

In some embodiments, the actuator mechanism 60 may comprise an arm 62 having a first end 64 pivotably mounted on a rotatable disc 66 and a detent 68 forming at least a part of a second end 70 for releasably mechanically engaging the transport system 12 at a surface 72 of the second end 30 of piston 24. The arm 62 is biased towards the piston 24, here by a spring bias 74, so that as the sample test cassette 2 is entered into the holder 50 the detent 68 positively engages the surface 72. In some embodiments a motor (not shown) is also provided internal the holder 50 to impart rotary movement to a shaft 76 on which the rotatable disc 66 is mounted. In other embodiments the motor or both the motor and the shaft 76 may be located external of the holder 50, internal of the housing 40 of the analyte test system 38 to engage the rotatable disc 66 when the holder 50 is fully located in a corresponding slot 42 of the housing 40. In some embodiments a protrusion 78, such as a pin, is provided on the rotatable disc 66 at a location circumferentially displaced from the first end 64 of the arm 62.

Figure 5A:
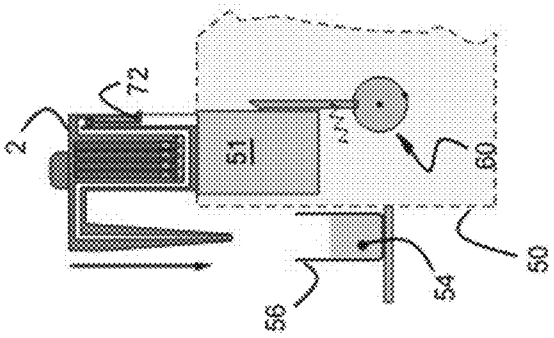
FIGS. 5A, 5B, 5C, and 5D Illustrate the operation of the actuator of the analyte test system according to FIG. 3.
Figure 5B:
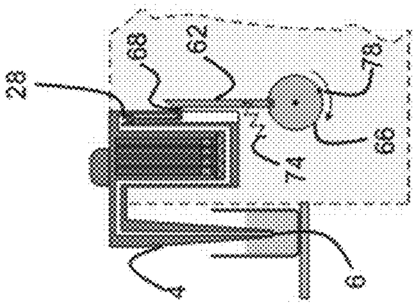
Figure 5C:
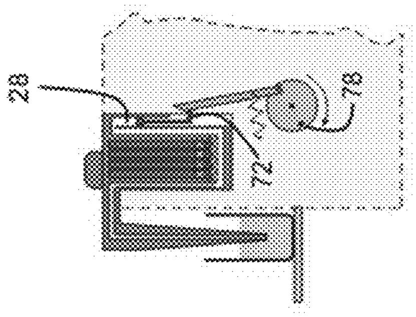
Figure 5D:
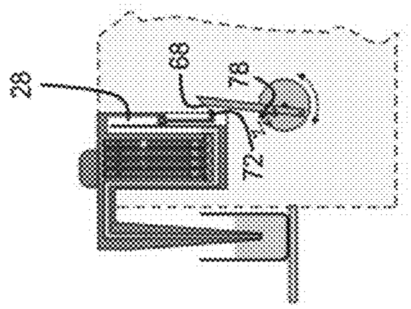

The operation of the actuator mechanism 60 will now be further explained with reference to the drawings of FIGS. 5A, 5B, 5C, and 5D. the sample test cassette 2 is inserted into the holder 50 (FIG. 5A) until the opening 6 of the inlet 4 is immersed in sample liquid 54 in vial 56 and the detent 68 is engaged with the surface 72 of piston 24 (FIG. 5B), to lock the sample test cassette 2 in the holder 50 in its reading position. The arm 62 of the actuator mechanism 60 is now at or close to its highest position and the spring bias 74 maintains a positive contact between detent 68 and surface 72. The disc 66 is rotated (curved arrow in FIG. 5C) to move the arm 62 in a generally downwards direction. This results in a corresponding downwards movement of the piston 24, causing an increase in the volume of the variable volume fluid receiving space 28 and an uptake of sample liquid 54 into the sample test cassette 2. The rotation of the disc 66 is continued and the protrusion 78 on the disc 66 engages the arm 62 (FIG. 5D). At this point the variable volume fluid receiving space 28 is at its maximum volume and transport of sample liquid 54 into the sample test cassette 2 is completed. Typically now, rotation is halted and the optical reading system 48 (or other known reading system) is operated to interrogate, here optically, the test strip(s) 10 to determine the presence or absence of an analyte in sample liquid 54 that has been transported into the sample test cassette 2. The rotation of the disc 66 may then be continued. The protrusion 78 pushes against the arm 62 and causes the detent 68 to disengage from the surface 72. The sample test cassette 2 is now no longer locked in the holder 50 by the detent 68 and may be removed.

In some embodiments, the speed of rotation of the disc 66 may be variable in order to maintain a constant linear movement of the piston 24. This is useful in order to avoid cavitation in the sample liquid 54 which may produce undesirable bubbles in the sample liquid within the sample test cassette 2. Indeed, any desired linear movement profile for the piston 24 may be achieved through suitable regulation of the rotation of the disc 66.

Figure 6:
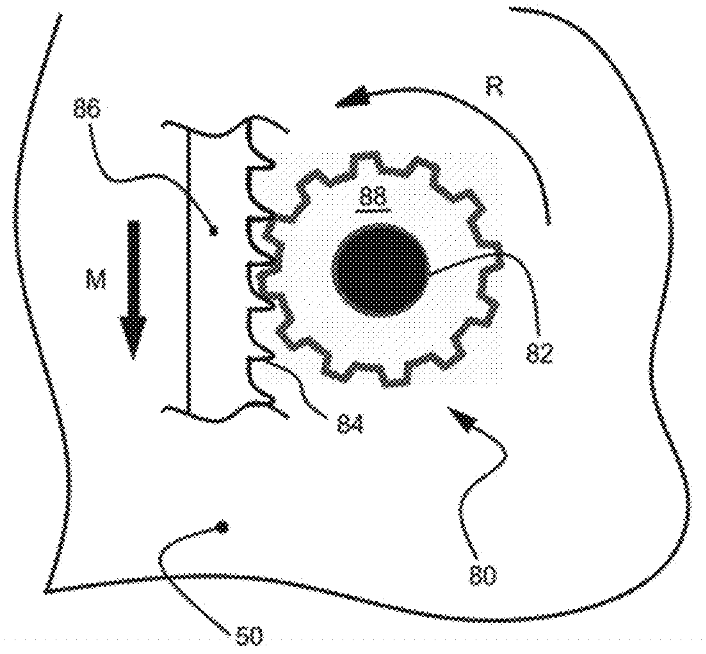
FIG. 6 Illustrates a further embodiment of an actuator.

A further embodiment an actuator mechanism 80 is illustrated in FIG. 6 together with related portions of a transport system equivalent to the transport system 12 of the sample test cassette 2 which is illustrated in FIG. 1. Illustrated is a toothed portion 84 of a piston 86 of a piston pump assembly, similar to the piston pump assembly of the transport system 12 of the embodiment illustrated in FIG. 1. The actuator mechanism 80 comprises a sprocket 88 mounted on a rotatable shaft 82 of a motor (not shown). The sprocket 88 engages the toothed portion 84 as a sample test cassette is entered into the holder 50. Rotation of the sprocket 88 in one direction R causes linear movement M of the piston 86 to increase a volume of a variable volume fluid receiving space of the piston pump assembly and an uptake of sample liquid from external of the sample test cassette.

Figure 7:
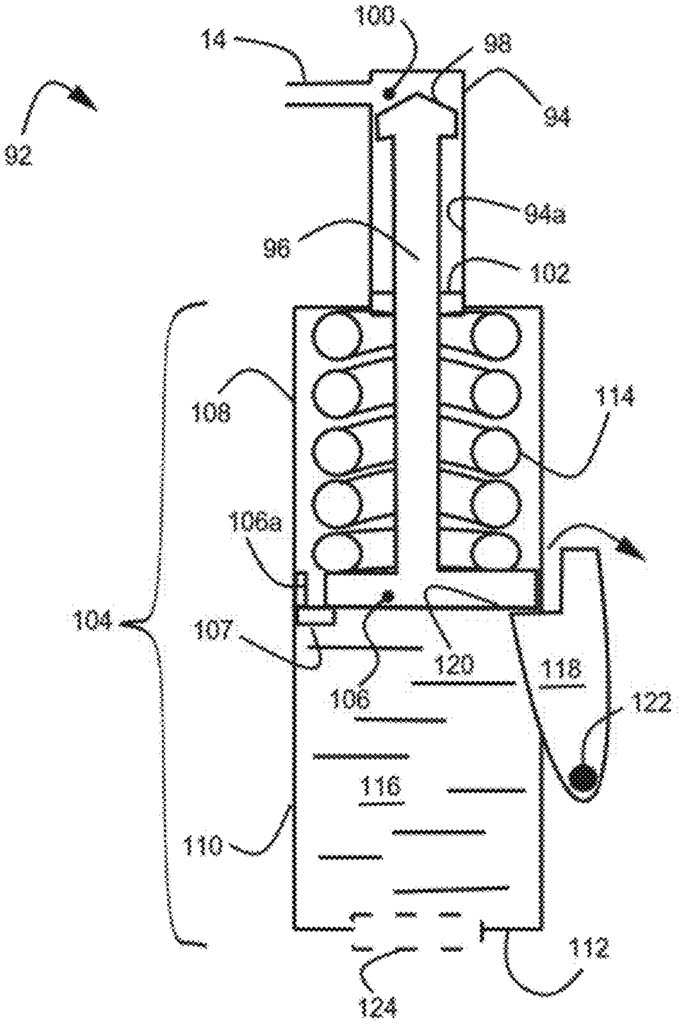
FIG. 7 Illustrates a further embodiment of a transport system.

A further embodiment of transport system 92 is illustrated in FIG. 7 that may substitute for the transport system 12 which is illustrated in FIG. 1. Different to the transport system 12 of FIG. 1, and as will be described below, the present transport system 92 requires no external drive motor in order to maintain a flow of sample liquid within the sample test cassette of the present invention.

The transport system 92 comprises a pump chamber 94 that is arranged in fluid communication with an end of the conduit 14; and a piston 96 having a first end 98 slidably engaged with an inner wall 94*a* of the pump chamber 94 to delimit therewith a variable volume fluid receiving space 100. The piston 96 passes out of the pump chamber 94 through a fluid tight seal 102 into a compartment 104 where it terminates at a second end 106. The second end 106 provides a fluid tight seal and divides the compartment 104 into a spring chamber 108 and a damping chamber 110 which is sealed at an end 112 opposite the second end 106. The second end 106 is provided with a number of through holes (one illustrated 106*a*) which provide a liquid passageway between the damping chamber 110 and the spring chamber 108 and each of which, in the present embodiment, are sealed by a pressure sensitive, rupturable seal 107. The spring chamber 108 houses a spring 114 under tension and provides a biasing force which acts on the second end 106 of piston 96 to tend to move the piston 96 to cause the variable volume fluid receiving space 100 to increase. A damping liquid 116 fills the damping chamber 110 and provides a hydraulic pressure which produces a force opposing but less than the biasing force of the tensioned spring 114. The spring 114 and damping liquid 116 co-operate to form an actuator mechanism. A latch 118 is provided to releasably engage the piston 96 and hold it against the bias force in a rest position. In the present embodiment the latch 118 locates against a lower surface 120 of the second end 106 of the piston 96 to prevent movement of the piston 96 until transportation of sample liquid into the cassette is required and is moveable to disengage from the piston 96, in the present embodiment by rotation about a pivot 122.

When the latch 118 is disengaged the piston 96 moves under influence of the bias force exerted by the spring 114 to compress the damping liquid 116 and the hydraulic pressure increases. The increase in hydraulic pressure eventually causes the seal 107 to rupture which, in turn, allows damping liquid to flow into the spring chamber 108 and a continued, controlled, movement of the piston 96 to increase the volume of the variable volume fluid receiving space 100 occurs.

In other embodiments the through holes 106*a* and latch 118 are removed and a rupturable seal 124 (broken line construction in FIG. 7) may be provided to replace, at least in part, the sealed end 112 of the damping chamber 110. On rupture of the seal 124, which in some embodiments may be done manually, damping liquid 116 can leave the damping chamber 110. This causes a reduction in counter-force exerted by the damping liquid 116 and allows the piston 96 to move under the influence of the force exerted by the spring 114.

Other embodiments may include a transport system other than a piston pump system, for example may include a peristaltic pump system, which is fluidly connected to the inlet of a sample test cassette with which it is integrated and which is operable to transport liquid from external of the cassette to elongate lateral flow test strips located in therein.

The invention claimed is:

1. A sample test cassette, comprising:

an inlet configured to introduce a sample liquid into the sample test cassette;

an elongate channel configured to receive an elongate lateral flow test strip and configured with a first end that is configured to be in liquid communication with the inlet;

a mechanical transport system that is an integral part of the sample test cassette and is configured to generate a flow of the sample liquid from outside of the inlet and towards the first end of the elongate channel; and a conduit having a first conduit end connected to the inlet and a second conduit end connected to the mechanical transport system, the conduit extending from the first conduit end to the second conduit end to connect the inlet to the mechanical transport system, wherein the first end of the elongate channel is connected between the inlet and the mechanical transport system through a branch connection between the elongate channel at the first end of the elongate channel and the conduit at a conduit portion between the first conduit end and the second conduit end.

2. The sample test cassette of claim 1, wherein the sample test cassette includes one or more inner surfaces at least partially defining a reservoir that is configured to be in liquid communication with both the first end of the elongate channel and with the inlet and is configured to hold the sample liquid for contact with a sample receiving portion of the elongate lateral flow test strip received in the elongate channel.

3. The sample test cassette of claim 1, wherein at least a section of a wall of the sample test cassette that overlies at least a portion of the elongate channel corresponding with an analysis zone of a lateral flow test strip received therein includes an aperture is configured to allow transmission of optical radiation between the portion of the elongate channel and an exterior of the sample test cassette.

4. The sample test cassette of claim 1, wherein the mechanical transport system includes a piston pump assembly having an inner wall at least partially defining a pump chamber and a piston, the piston having a first end configured to slidably engage with the inner wall at least partially defining the pump chamber to delimit, in cooperation therewith, a variable volume fluid receiving space within the pump chamber.

5. The sample test cassette of claim 1, further comprising: the elongate lateral flow test strip in the elongate channel.

6. An analyte test system, comprising:

a housing;

a reading system; and a holder, wherein the holder is configured to releasably locate the sample test cassette of claim 1 in a reading position at which the reading system is aligned in with the elongate channel of the sample test cassette to permit an interrogation of the elongate lateral flow test strip when the elongate lateral flow test strip is located in the elongate channel to test for a presence of an analyte.

7. The analyte test system of claim 6, wherein the reading system is an optical reading system comprising a complementary arrangement of a light source and an optical detector configured to define therebetween an optical path which, when the sample test cassette is located in the reading position, intersects the elongate channel to permit an optical interrogation of the elongate lateral flow test strip when the elongate lateral flow test strip is located in the elongate channel.

8. The analyte test system of claim 6, wherein the housing comprises a slot configured to receive and releasably retain the holder.

9. The analyte test system of claim 7, wherein one or both of the light source and the optical detector is located internal of the holder.

10. The analyte test system of claim 6, further comprising an actuator mechanism configured to engage with the mechanical transport system of the sample test cassette based on the sample test cassette being located in the holder and to actuate the mechanical transport system to generate the flow of the sample liquid.

11. The analyte test system of claim 10, wherein the holder holds internally the actuator mechanism.

12. The analyte test system of claim 10, wherein the actuator mechanism comprises a drive engagable with the mechanical transport system and rotatable to actuate the mechanical transport system to generate the flow of the sample liquid.

13. The analyte test system of claim 12, wherein the drive comprises a rotatable disc and an arm having a first end fixed to the rotatable disc and a second end configured with a detent configured to releasably mechanically engage with the mechanical transport system.

14. The analyte test system of claim 13, wherein the rotatable disc includes a protrusion that is circumferentially displaced on the rotatable disc from the first end of the arm to contact the arm when the rotatable disc is rotated by a predetermined amount.

15. The analyte test system of claim 13, wherein the mechanical transport system comprises:

an inner wall at least partially defining a pump chamber configured to be in liquid communication with the second conduit end of the conduit; and a piston having a first end configured to slidably engage with the inner wall at least partially defining the pump chamber to delimit therewith a variable volume fluid receiving space within the pump chamber and having a second end including a surface configured to releasably mechanically engage with the detent.

16. The analyte test system of claim 12, wherein the drive comprises a sprocket that is engagable with a toothed portion of a piston of the mechanical transport system, and rotatable to impart a linear motion to the piston when engaged with the toothed portion.

17. The analyte test system of claim 10, wherein the sample test cassette holds the actuator mechanism housed in a compartment that is divided internally by a second end of a piston into a spring chamber, housing a spring that is in engagement with the second end of the piston and a damping chamber housing a damping fluid, the second end of the piston being distal to a first end of the piston which is located in slidable engagement with an inner wall at least partially defining a pump chamber.

18. The analyte test system of claim 6, further comprising:

an incubation temperature regulator that is housed within the holder, the incubation temperature regulator configured to maintain a temperature of the sample test cassette that is located in the holder at a predetermined temperature, wherein the incubation temperature regulator includes a heating and/or cooling element and a temperature sensor, and wherein the analyte test system is further configured to cause the incubation temperature regulator to maintain the temperature of the sample test cassette at the predetermined temperature based on signals received from the temperature sensor of the incubation temperature regulator.

19. The analyte test system of claim 6, wherein the analyte test system is configured to control the mechanical transport system to control and automate a flow rate of the flow of the sample liquid and a volume of the sample liquid that is introduced to the elongate lateral flow test strip in a repeatable manner.

20. The sample test cassette of claim 1, wherein the mechanical transport system includes a pump system.

* * * * *